United States Patent [19]

Schulz

[11] Patent Number: 4,580,486

[45] Date of Patent: Apr. 8, 1986

[54] APPARATUS FOR SUPPLYING AIR TO COMPARTMENTS

[75] Inventor: Joachim Schulz, Amorbach, Fed. Rep. of Germany

[73] Assignee: Aurora Konrad G. Schulz GmbH & Co., Mudau, Fed. Rep. of Germany

[21] Appl. No.: 707,093

[22] Filed: Mar. 1, 1985

[30] Foreign Application Priority Data

Mar. 5, 1984 [DE] Fed. Rep. of Germany ....... 3408104

[51] Int. Cl.[4] .................. B60H 3/06; F28F 27/02
[52] U.S. Cl. .................... 98/2.05; 98/2.06; 98/DIG. 8; 237/12.3 A
[58] Field of Search ........ 98/2.05, 2.06, 8.32, 98/DIG. 8; 237/12.3 A

[56] References Cited

U.S. PATENT DOCUMENTS

| 173,003 | 2/1876 | Hargreaves | 98/8 |
| 2,116,911 | 5/1938 | Richardson | 98/DIG. 8 |
| 2,739,521 | 3/1956 | Spear | 98/DIG. 8 |
| 4,227,569 | 10/1980 | Wattin | 237/12.3 A |
| 4,356,966 | 11/1982 | Kado | 237/12.3 A |
| 4,407,354 | 10/1983 | Takishita et al. | 98/2.06 |
| 4,515,208 | 5/1985 | Sakurai et al. | 98/2.05 |

FOREIGN PATENT DOCUMENTS

| 3039148 | 4/1981 | Fed. Rep. of Germany | 98/2.05 |
| 3016679 | 11/1981 | Fed. Rep. of Germany | 98/2.05 |
| 55-68413 | 5/1980 | Japan | 98/2.05 |
| 57-99411 | 6/1982 | Japan | 98/2.05 |
| 58-177707 | 10/1983 | Japan | 98/2.06 |

Primary Examiner—Henry C. Yuen
Attorney, Agent, or Firm—Becker & Becker, Inc.

[57] ABSTRACT

An apparatus for supplying air to a compartment. The apparatus has at least one air-inlet opening which is closable by a flap mounted to swing freely. At least one blower is provided. In order to avoid creating drafts, an electromagnet is mounted on the frame which surrounds the air-inlet opening, and the flap has an armature or member which cooperates with the electromagnet in the closed position of the flap.

13 Claims, 3 Drawing Figures

APPARATUS FOR SUPPLYING AIR TO COMPARTMENTS

BACKGROUND OF THE INVENTION

1. Field of the Invention

The present invention relates to an apparatus for supplying air to a compartment, for example in the interior of a vehicle, such as the passenger compartment of a bus. The apparatus comprises a housing having at least one air-inlet opening which can be closed by a freely swinging flap. The apparatus also comprises at least one blower disposed in the housing, and an air outlet leading into the compartment.

2. Description of the Prior Art

In a known apparatus of this general type, a flap of elastically deformable material is secured to the upper edge of a recirculated air inlet opening. Under its own weight, in the closed position, the flap covers the recirculated air inlet opening. Although the flap can be weighted at the lower free edge thereof, so that the flap does not open under slight air-pressure differences, this arrangement has the disadvantage that the blower has to be of correspondingly more powerful design in order to open the flap and to keep it open. This simultaneously increases the noise level of the ventilating or air supply apparatus, which proves to be unpleasent for the driver and passengers. A flap of this type which swings uncontrollably is not suitable for arrangement in the ram air zone, since at an appropriate pressure difference it allows fresh air to pass and thus creates a draft. This is undesirable, for example when starting up in cold weather, if the blower is associated with a heat exchanger which is connected to the coolant circuit of the internal combustion engine. The same disadvantage is known to arise if a freely swinging flap is provided for closing a by-pass to the blower. In order to prevent the uncontrollable admission of fresh air in such an arrangement, thereby creating a draft, there is known to provide inlet openings for fresh air with large flaps which have to be controlled mechanically, hydraulically, or pneumatically. Servomotors or operating cylinders are required for this purpose, and need appropriate control members. The space requirement of such flaps, and their actuating members, is thus rather large. The structural outlay, dead weight, maintenance and servicing costs, and probability of breakdown are all considerable.

In contrast, an object of the present invention is to provide an apparatus for supplying air to compartments, according to which the creation of drafts is prevented when air pressure differences are encountered while structural expenses are kept as low as possible.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The apparatus of the present invention is characterized primarily in that an electromagnet is disposed on the frame which surrounds the air-inlet opening. A flap is provided with an armature or member which cooperates with the electromagnet in the closed position of the flap.

The advantage is thereby achieved that, in the simplest mode of construction, the flap can be made of aluminum or plastic. Only the member consists of iron. If the flap is closed and the electromagnet energized, so that the member is attracted and the flap is retained in the closed position, no draft is created, despite air-pressure differences at the flap. Accordingly, the electromagnet can be designed for any magnitude of air-pressure difference. The flap is always retained in its closed position until the air-pressure difference across the flap exceeds the retaining force of the electromagnet or electromagnets.

Advantageously, at least one inlet opening for fresh air closable by a freely swinging flap is disposed at the front end and/or side of a vehicle. In particular, the opening and flap can be disposed on the side in the rear zone of a large-capacity vehicle, such as a bus, since here a high pressure zone is formed when traveling. The opening and flap also can be disposed below the floor of a passenger compartment.

Additionally, the housing can have an inlet opening for recirculated air from the compartment, for reexample the passenger compartment; the recirculated air inlet opening may be provided with a further freely swinging flap, with an electromagnet being mounted on its frame, and with the further flap having an armature or member which cooperates with the electromagnet in the closed position of the flap.

The frame of the air-inlet opening and/or of the recirculated air inlet opening, and, therefore, the flap or flaps, may be inclined so as to stabilize the flaps in their closed position.

A heat exchanger can be associated with the blower if the apparatus is designed for heating as well as ventilating a compartment.

The electromagnet at the fresh air inlet opening, and the electric motor of the blower, can be energized alternately by a change-over switch, so that the electric motor is stopped when the electromagnet retains the flap in the closed position. An appropriate circuit can be provided if the housing is provided with a recirculated air inlet opening which likewise has an electromagnet. For example, the electromagnet at the fresh air inlet opening, and the electric motor of the blower, can be energized together, and the electromagnet at the recirculated air inlet opening, and the electric motor, can be energized alternately.

Pursuant to further advantageous features of the present invention, the heat exchanger may be disposed after the blower in a trough-like housing. Furthermore, the flap may be made of aluminum or plastic.

DESCRIPTION OF PREFERRED EMBODIMENTS

Figure 1:
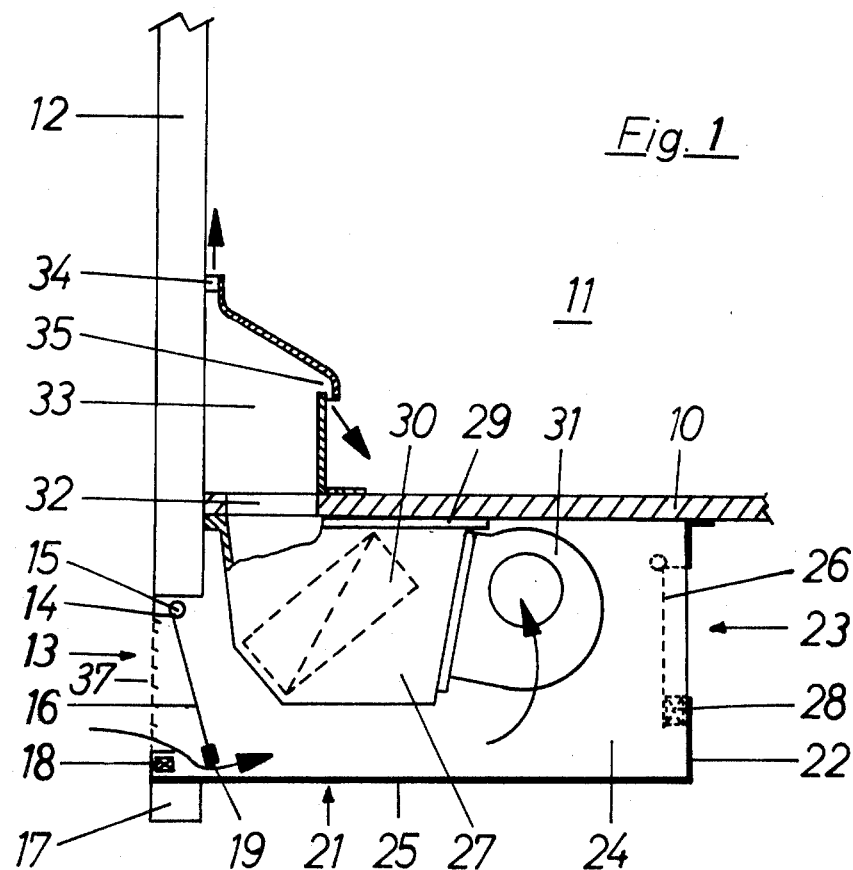
FIG. 1 is a cross-sectional view of one embodiment of the apparatus of the present invention, disposed beneath the floor of a passenger compartment.

Referring now to the drawings in detail, and in particular to FIG. 1, seats (not shown) for the passengers are disposed on the floor 10 of a passenger compartment 11 of a bus. In a side wall 12, an inlet opening 13 for fresh air is provided below the floor 10. The inlet opening 13 is surrounded by a frame 14; at the upper edge of the frame 14, a support 15 is provided for a freely swinging flap 16. The flap 16 comprises a flat sheet of aluminum. It may also be made of plastic material, such as hard PVC. An electromagnet 18 is disposed on the frame 14 in the vicinity of a lower longitudinal beam or span 17 of the side wall 12. An armature or member 19 cooperates with the electromagnet 18 in the closed position of the flap 16; this member is made of iron, and is secured to the free end of the flap 16. The electromagnet 18 is provided with leads 20 for electric current.

Below the floor 10, a housing 21 adjoins the fresh air inlet opening 13. The housing 21 has a rear wall 22, side walls 24, and a bottom 25. The rear wall 22 may be provided with an inlet opening 23 for return or recirculated air from the passenger compartment 11. A recirculated air inlet opening 23, if provided, may be closable by a freely swinging flap 26. An electromagnet 28 is provided to secure the flap in the closed position.

In the exemplary embodiment illustrated, inside the housing 21 there is disposed another housing 27 which is shaped like a trough open on one side, the open side being surrounded by a flange 29 via which the trough-like housing 27 is fastened to the underside of the floor 10. A heat exchanger 30 is disposed inside the trough-like housing 27, and a blower 31 is mounted at the inlet of the housing 27. In the illustrated embodiment, the blower is a double-flow radial blower. The outlet 32 from the trough-like housing 27 is formed by an opening in the floor 10. Above the air outlet 32 there extends in the longitudinal direction of the side wall 12 of the vehicle an air-outlet channel 33 having an air-outlet slot 34 which directs the air flow via the side wall 12 towards the side windows. Another longitudinal slot 35 directs air into the floor zone of the passenger compartment 11.

The frame 14 of the air-inlet opening 13, and/or of the recirculated air inlet opening 23, and, therefore, the flap 16 or 26 respectively, can be inclined in order to stabilize the flap 16 or 26 in the closed position, i.e. to press it against the frame 14, so that, despite vibrations when traveling, the member 19 rests securely against the electromagnet 18.

Figure 3:
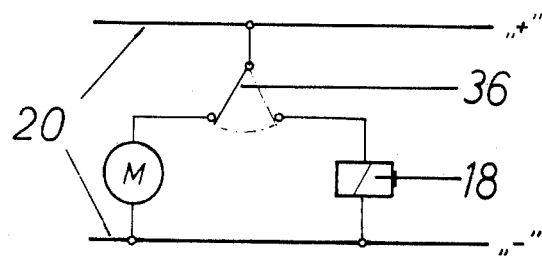
FIG. 3 shows one exemplary embodiment of the switching circuit for the motor and the electromagnet of the flap.
Figure 2:
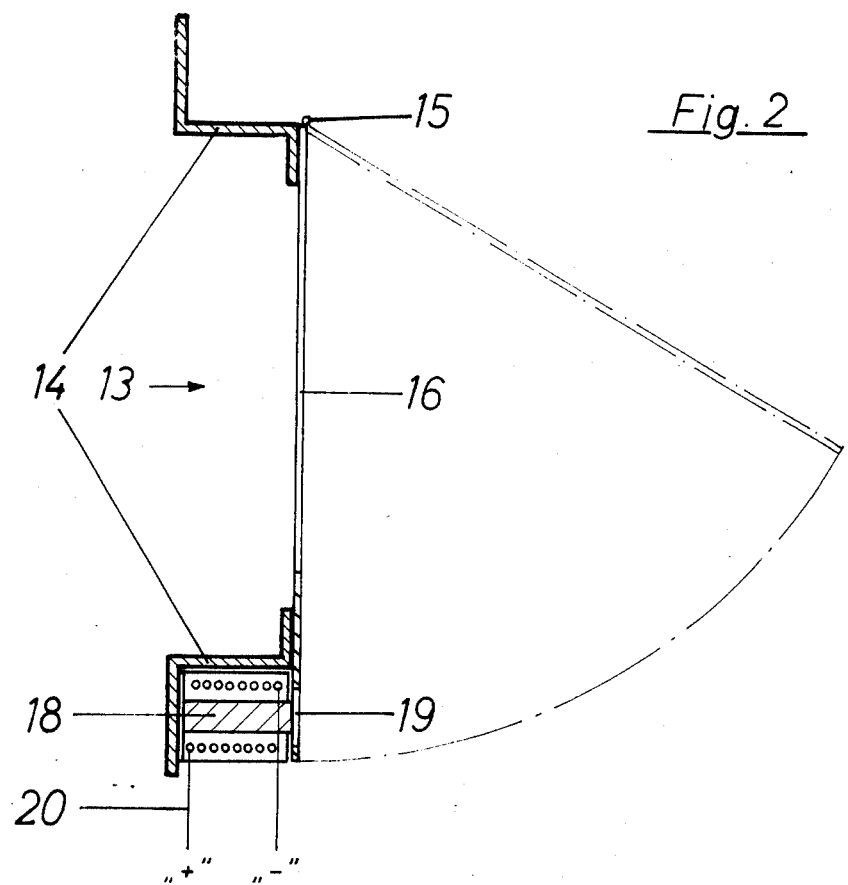
FIG. 2 is an enlarged cross-sectional view of the flap area.

FIG. 3 shows the arrangement of a change-over or double-throw switch 36 for an exemplary embodiment in which only the flap 16 is provided and controlled; the blower 31, which has an electric motor M, is also controlled. In the position of the change-over switch 36 shown in FIG. 3, the electric motor M is operative, i.e. the electromagnet 18 is deenergized, and the flap 16 is open. Fresh air can pass from the side through the fresh air inlet opening 13 into the housing 21, is forced by the blower 31 into the trough-like housing 27, passes through the heat exchanger 30 if one is provided, flows through the air outlet 32, and arrives uniformly distributed in the passenger compartment 11. If the recirculated air inlet opening 23 is open at the same time, the blower 31 also draws in recirculated air, and a blending operation takes place.

The change-over switch also may be designed in such a way that the electric motor M of the blower 31, and the electromagnet 28, are supplied simultaneously, so that pure fresh air is then fed to the passenger compartment 11, which is heated when the heat exchanger 30 is connected to the coolant circuit.

Furthermore, the change-over switch may be designed in such a way that the electromagnet 18 and the electric motor 11 of the blower 31 simultaneously are supplied with current, so that only recirculated air is fed to the air outlet 32 via the recirculated air inlet opening 23. This setting is particularly favorable if in cold weather the passenger compartment 11 is to be heated up rapidly when starting out.

Although the exemplary embodiment has been described with reference to a passenger compartment of a bus, the apparatus also is suitable for the heating, ventilation, and even air-conditioning of other, in particular stationary, rooms or compartments. For air-conditioning, the blower may be associated with a vaporizer as an alternative to the heat exchanger 30.

The housing 21 also may be formed by the entire luggage compartment of a motor coach.

If the fresh air inlet opening 13 is provided at the front end of a vehicle, the flap 16, the blower 31, and the heat exchanger 30 if present, and the air outlet 32 are disposed one after the other, for example inside a roof duct.

The fresh air inlet opening 13, or several fresh air inlet openings, also may be disposed one after the other in the upper region of the side walls of a bus. In the front zone of the bus, the flaps 16 are then primarily opened by the blower or blowers 31, whereas the higher external pressure in the rear zone is generally sufficient to open the flaps 16.

To prevent dust, rain, and dirty water from entering the housing 21, the fresh air inlet opening 13 can be provided with a protective grille 37.

Premature opening of the flap 16 under just slight pressure differences can be prevented by providing a timing element (not shown) in the control line or lead 20 which leads to the electromagnet 18; when the flap tries to open, the timing element effects delayed interruption of the current supply. It is also possible for each flap 16 to be associated with a plurality of members 19 and electromagnets 18.

The present invention is, of course, in no way restricted to the specific disclosure of the specification and drawings, but also encompasses any modifications within the scope of the appended claims.

What I claim is:

1. An apparatus for supplying air to a compartment or room according to which creation of drafts is prevented when air pressure differences are encountered, said apparatus comprising:
    a primary housing having at least one inlet opening for receiving air, and an air outlet which leads to said compartment; each of said air inlet openings being surrounded by a frame;
    a respective flap for closing each of said air inlet openings; each of said flaps being mounted on the frame of an air inlet opening therewith so as to swing freely when allowed to do so;
    at least one blower disposed in said housing;
    at least one electromagnet mounted on each frame of each of said air inlet openings; and
    at least one armature member of iron mounted on each of said flaps in a location wherein said member operatively cooperates with said electromagnet of that frame in the closed position of the respective flap so as to assure that the flap is attracted and retained in the closed position while said electromagnet is energized whereby no draft is created despite air-pressure differences at said flap.

2. An apparatus according to claim 1, which includes at least one air inlet opening for fresh air at a front end of a vehicle; at least one flap being provided for closing said air inlet opening.

3. An apparatus according to claim 1, which includes at least one air inlet opening for fresh air at one side of a vehicle; at least one flap being provided for closing said air inlet opening.

4. An apparatus according to claim 3, in which said air inlet opening and said flap are disposed on one side of a rear portion of a large-capacity vehicle.

5. An apparatus according to claim 4, in which said compartment is a passenger compartment and has a floor; and in which said housing for said air inlet opening and said flap are disposed below said floor of said passenger compartment.

6. An apparatus according to claim 1, in which said housing includes at least one inlet opening for fresh air, and at least one inlet opening for recirculated air from said compartment, each of said inlet openings being provided with a flap having said armature members of iron which cooperate with an electromagnet in the closed position of that flap.

7. An apparatus according to claim 6, in which each of said frames for said air inlet openings, and hence each of said flaps, is inclined so as to stabilize said flaps in a closed position thereof.

8. An apparatus according to claim 6, in which a heat exchanger is associated operatively with said blower.

9. An apparatus according to claim 8, which includes a trough-like housing which, when viewed in the direction of flow of air from said blower to said air outlet, is disposed in said primary housing after said blower; said heat exchanger being disposed in said trough-like housing.

10. An apparatus according to claim 6, in which each of said flaps is made of aluminum.

11. An apparatus according to claim 6, in which each of said flaps is made of plastic.

12. An apparatus according to claim 6, which includes an electric motor for said blower; and which includes a switching mechanism for alternately energizing said electromagnet of said fresh air inlet opening, and said electric motor.

13. An apparatus according to claim 6, which includes an electric motor for said blower; and which includes a switching mechanism for jointly energizing said electromagnet of said fresh air inlet opening, and said electric motor, and for alternately energizing said electric motor and said electromagnet of said recirculated air inlet opening.

* * * * *